United States Patent
Fukuda

[11] Patent Number: 6,035,987
[45] Date of Patent: Mar. 14, 2000

[54] MULTI-PLATE CLUTCH

[75] Inventor: Yoshinobu Fukuda, Neyagawa, Japan

[73] Assignee: Exedy Corporation, Osaka, Japan

[21] Appl. No.: 09/311,699

[22] Filed: May 13, 1999

[51] Int. Cl.⁷ .................................................. F16D 13/52
[52] U.S. Cl. .................................. 192/70.27; 192/109 A; 192/70.2; 192/89.24
[58] Field of Search ................................. 192/70.17, 70.2, 192/70.27, 70.28, 89.24, 109 A, 212, 70.19

[56] References Cited

U.S. PATENT DOCUMENTS

| | | | |
|---|---|---|---|
| 1,717,534 | 6/1929 | Wemp | 192/70.12 |
| 3,791,499 | 2/1974 | Ryan | 192/70.27 |
| 4,846,326 | 7/1989 | Tilton et al. | 192/70.19 |
| 5,181,594 | 1/1993 | Nash | 192/70.27 |
| 5,284,232 | 2/1994 | Prud'Homme | 192/70.21 |
| 5,301,779 | 4/1994 | Nash | 192/70.2 |
| 5,385,224 | 1/1995 | Uehara | 192/52.1 |
| 5,415,262 | 5/1995 | Bernal et al. | 192/70.19 |
| 5,505,286 | 4/1996 | Nash | 192/52.1 |
| 5,638,932 | 6/1997 | Mizukami | 192/70.12 |
| 5,779,018 | 7/1998 | Hofmann et al. | 192/70.14 |
| 5,878,857 | 3/1999 | Fukuda et al. | 192/70.27 |

*Primary Examiner*—Charles A Marmor
*Assistant Examiner*—Saúl Rodríguez
*Attorney, Agent, or Firm*—Shinjyu Global IP Counselors, LLP

[57] ABSTRACT

A multi-plate clutch 1 of a boss driving type is provided with structure to make it easy to replace a boss, and to limit the number of parts. The clutch 1 basically includes a flywheel 2, a boss 9, a clutch cover assembly 3, and input-output friction members such as clutch disks 42 and 43, an intermediate plate 44, and a pressure plate 17. The boss 9 is detachably coupled to the flywheel 2. The boss 9 includes an annular portion 10 and a plurality of columnar portions 11, which are formed integrally with the annular portion 10. The columnar portions 11 extend in an axial direction from the annular portion 10. Each of the columnar portions 11 is disposed circumferentially next to one another in a circular pattern with a radial pass-through space formed therebetween. The clutch cover assembly 3 includes a clutch cover 16 which is detachably coupled to the boss 9, a pressure plate 17, and a diaphragm spring assembly 18. The clutch disks 42 and 43 and the intermediate plate 44 are disposed between the friction face 7 and the pressure plate 17.

19 Claims, 4 Drawing Sheets

MULTI-PLATE CLUTCH

BACKGROUND OF THE INVENTION

1. Field of the Invention

This invention generally relates to a multi-plate clutch. More specifically, the present invention relates to a multi-plate clutch with a boss that couples a flywheel and a clutch cover assembly, and that drives a friction connecting plate on the input side.

2. Background Information

A multi-plate clutch is often used in such vehicles as racing cars. Multi-plate clutches generally comprise a flywheel on the engine side, a clutch cover assembly disposed axially apart from the flywheel, and a plurality of input and output members (for example, drive and driven plates) disposed between the flywheel and the pressure plate of the clutch cover assembly. The term "multi-plate clutch" as used herein means a clutch in which more than two output portions are disposed and more than three friction connecting faces are formed by the input member and the output member.

The flywheel and the clutch cover in the multi-plate clutch are typically coupled together by, for example, a cylindrical member. The cylindrical member is disposed on the outer circumferential side of the drive and driven plates. The cylindrical member has a plurality of teeth disposed circumferentially next to one another on the inner circumferential face. The teeth of the cylindrical member extend in an axial direction on the inner circumferential face and engage outer circumferential teeth of the drive plate. This engagement makes the drive plate axially movable and circumferentially unmovable against the cylindrical member. In other words, a torque is transmitted from the flywheel to the drive plate via the cylindrical member.

Some multi-plate clutches have a boss not only used to couple the flywheel and the clutch cover together, but also used to drive a drive plate. The boss is often a column like member extending in an axial direction, with radially extending spaces being formed in between circumferentially adjacent column like members. A connecting portion is formed on the outer circumference of the drive plate. The connecting portion is inserted in the spaces described above and engages the boss such that it is axially movable and circumferentially non-movable.

The above mentioned conventional multi-plate clutch of a boss-driving type has a boss which is formed in a body with a clutch cover or a flywheel. Some bosses have a plurality of columnar portions.

When the number of friction faces of the multi-plate clutch is changed by the user, the length of the clutch in an axial direction need to be adjusted by exchanging the boss. In that case, either a flywheel or a clutch cover assembly of a multi-plate clutch with the conventional structure need to be exchanged. In addition, when a boss is exchanged because of its abrasion, either a flywheel or a clutch cover assembly need to be exchanged together with the boss. When a boss has a plurality of columnar portions, this typically increases the number of parts and makes it difficult to maintain the accuracy on assembling them.

In view of the above, there exists a need for a multi-plate clutch which overcomes the above mentioned problems in the prior art. This invention addresses this need in the prior art as well as other needs, which will become apparent to those skilled in the art from this disclosure.

SUMMARY OF THE INVENTION

An object of the present invention is not only to make it easy to exchange a boss, but also to limit the number of parts needed in a multi-plate clutch with a boss-driving type.

A multi-plate clutch in accordance with one embodiment of the present invention includes an input rotary body, a boss, a clutch cover assembly and a plurality of input-output friction members. The input rotary body includes a friction face. The boss is detachably fixed to the input rotary body. The boss includes an annular portion and a plurality of connecting portions. The connecting portions are integrally formed with the annular portion and extend from the annular portion in an axial direction. Each of the connecting portions is disposed circumferentially next to one another in a circular pattern with a radial pass-through space formed therebetween. The clutch cover assembly includes a clutch cover, a pressure plate and an urging member. The clutch cover is detachably fixed to the boss and faces the friction face in an axial direction. The pressure plate is disposed on the friction face side of the clutch cover. The urging member is supported by the clutch cover and urges the pressure plate toward the friction face side. The input friction member is disposed axially between the friction face and the pressure plate. The input friction member is coupled to the plurality of connecting portions such that they are non-rotatably and axially movably relative to each other. The output friction member is disposed axially between the friction face and the pressure plate. The output friction member forms at least three friction connecting faces in the whole clutch.

In the multi-plate clutch of the present invention, the boss is detachably fixed to both the input rotary body and the clutch cover of the clutch cover assembly. Consequently, when the boss has to be replaced, it is enough to replace only the boss. As a result, since it is not necessary to replace a large member such as the clutch cover assembly and the flywheel, which has to be replaced in the case of a conventional multi-plate clutch, the operation to replace the boss is easy.

In the multi-plate clutch of the present invention, since the boss is a single portion which includes an annular portion and a plurality of connecting portions formed integrally, the number of parts does not need to be increased, and also the accuracy of dimension of parts can be improved.

In the multi-plate clutch of the present invention, the input friction member is coupled to the plurality of connecting portions of the boss non-rotatably and axially movably relative to each other.

In the multi-plate clutch of the present invention, the pressure plate recited above is connected with the plurality of connecting portions of the boss such that they are non-rotatably and axially movably relative to each other.

In the multi-plate clutch of the present invention, the annular portion mentioned above is detachably fixed to one of the input rotary body and the clutch cover, and the plurality of connecting portions is detachably fixed to the other of the input rotary body and the clutch cover.

In the multi-plate clutch of the present invention, the connecting portion mentioned above has the circumferential width smaller than the space that is formed in between the circumferentially adjacent connecting portions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
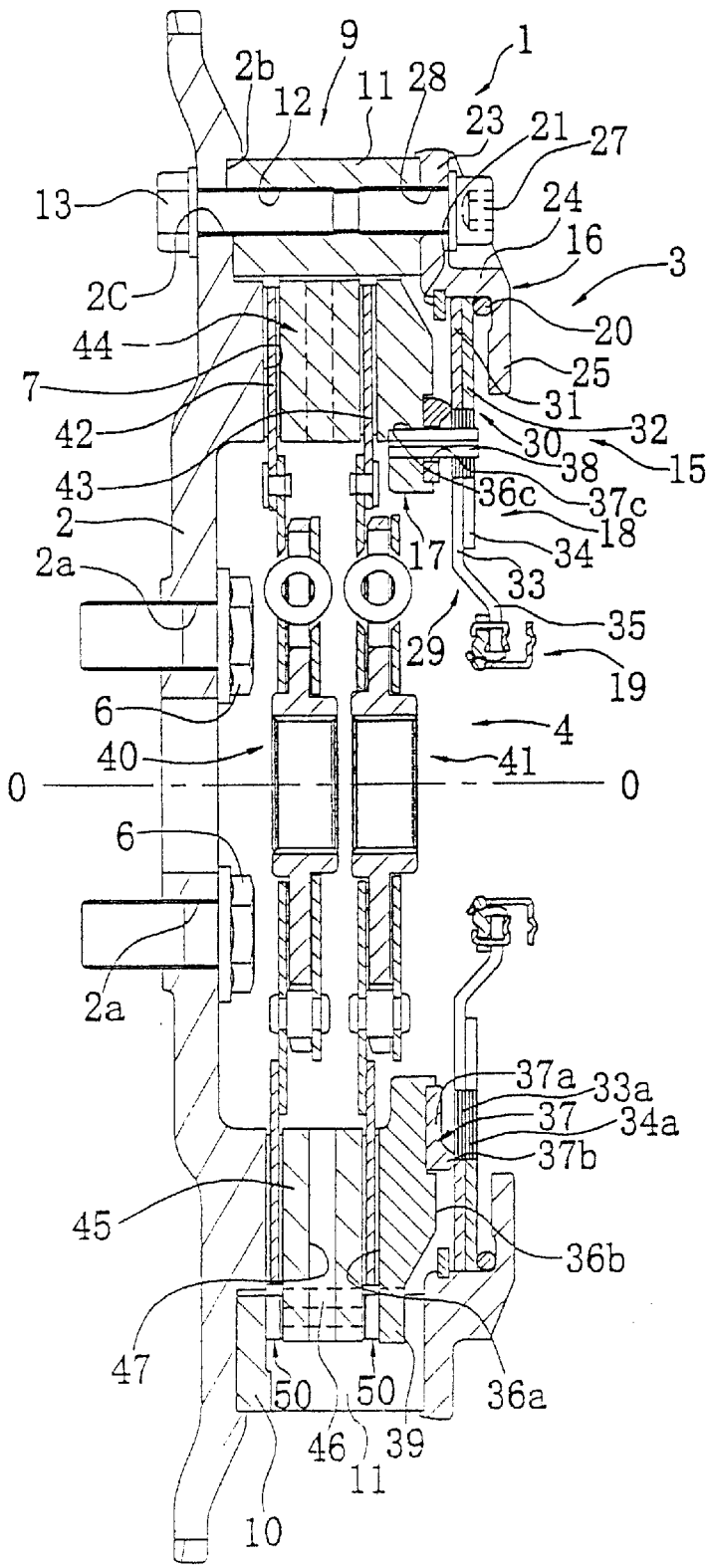
FIG. 1 is a cross sectional view of a clutch in accordance with the present invention.
Figure 2:
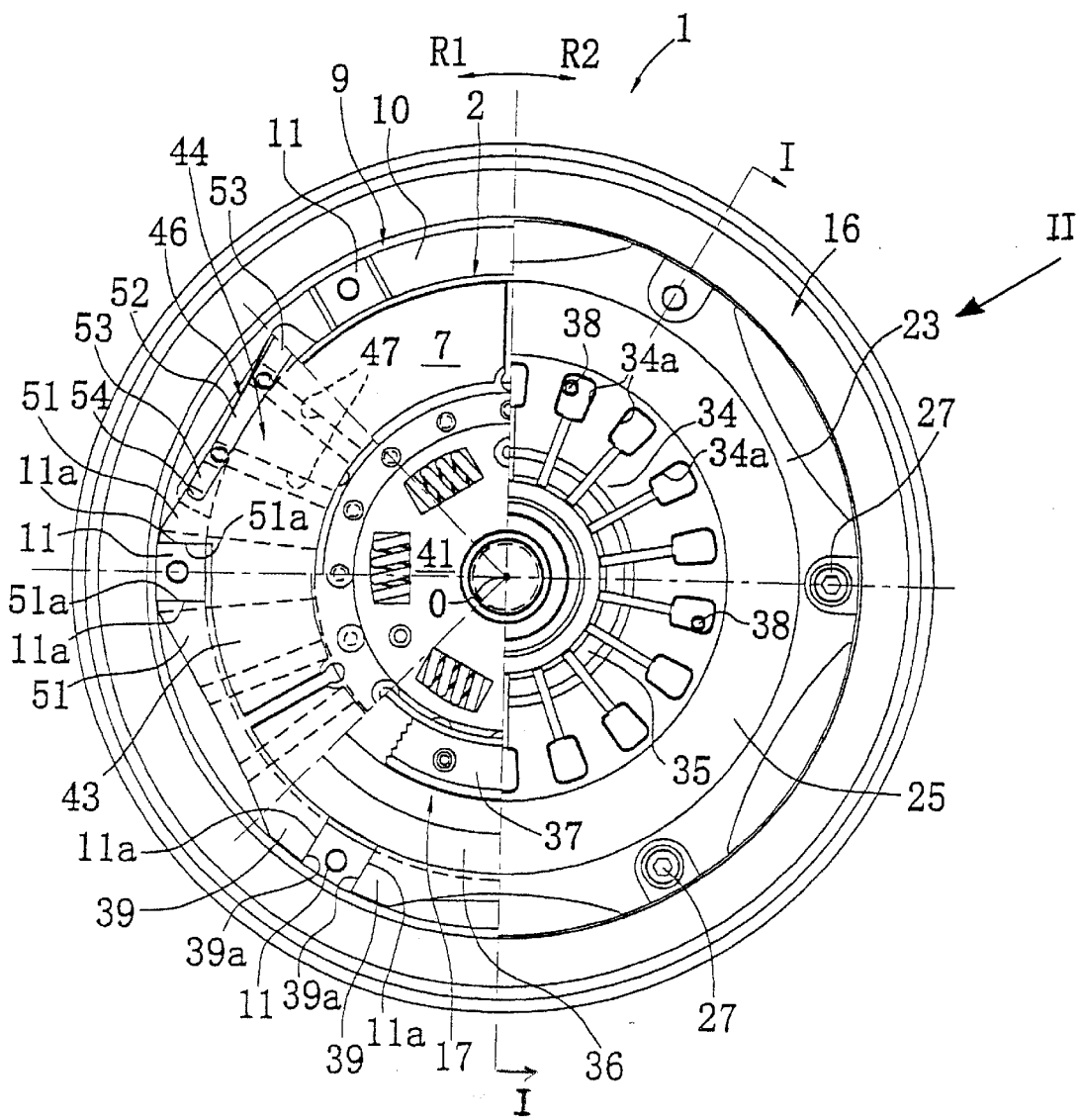
FIG. 2 is a right side elevational view of the clutch illustrated in FIG. 1 in accordance with the present invention with certain parts broken away for purposes of illustration.

Referring initially to FIGS. 1 and 2, a clutch 1 is illustrated in accordance with an embodiment of the present invention. The center line O—O shown in FIG. 1 is a rotational axis for clutch 1, while R1 shown in FIG. 2 is a rotational direction of the clutch 1. The clutch 1 is disposed between an engine and a transmission of a vehicle and has a primary clutch function to transmit or cut off a torque therebetween. In the preferred embodiment, the clutch 1 is a twin clutch with two clutch disk assemblies 40 and 41 (described later). The clutch 1 is especially designed to be used in, for example, racing vehicles. Of course, it will be apparent to those skilled in the art that the description hereinafter of the clutch 1 can be applied to a single plate clutch as well as to a multi-plate clutch with more than five friction connecting faces, as needed and/or desired.

As seen in FIG. 1, the clutch 1 basically includes a flywheel 2, a clutch cover assembly 3 and a clutch disk assembly 4. The flywheel 2 is a disk-shaped member with a central bore having its center located along center line O—O. The flywheel 2 is made of cast iron or steel. The inner circumference of the flywheel 2 is fixedly coupled in a conventional manner to a crankshaft (not shown) by a plurality of bolts 6. As a result, the flywheel 2 functions as an input rotary body in the clutch 1. The flywheel 2 has a plurality of holes 2a (not threaded) that receive bolts 6 therethrough. The holes 2a are formed circumferentially next to one another in a circular pattern at the inner circumference of the flywheel 2. An annular channel 2b is formed at the outer circumference of the flywheel 2 on the transmission side. The annular channel 2b has a plurality of non-threaded holes 2c extending in axial directions. The holes 2c are formed in the channel 2b circumferentially next to one another in a circular pattern. A friction face 7 facing the transmission side is formed on the inner circumferential side of the channel 2b. The friction face 7 is annular and flat.

A boss 9 is disposed at the outer circumference of the flywheel 2 on the transmission side. The boss 9 is a tubular member that fixes the flywheel 2 and a clutch cover assembly 3 together (described later). The boss 9 also functions as an input member by transmitting a torque from the flywheel to a pressure plate 17 and an intermediate plate 44. The boss 9 is preferably made of metallic material such as aluminum cast. The boss 9 includes an annular portion 10 and a plurality of columnar portions 11 (connecting portion) extending axially toward the transmission side from the annular portion 10. The annular portion 10 has a predetermined radial width, and a short axial height. The annular portion 10 is seated in the channel 2b of the flywheel 2. The outer circumferential face of the annular portion 10 touches the outer circumferential wall of the channel 2b, thereby determining the radial position of the boss 9 relative to the flywheel 2. A plurality (six in this embodiment) of columnar portions 11 is formed circumferentially next to one another in a circular pattern. The columnar portions 11 are long and narrow tubular members that extend in axial directions with spaces formed therebetween. In other words, the columnar portions 11 have larger axial lengths than the circumferential widths. The columnar portion 11, as shown in FIG. 2, has a roughly square cross section with a circumferential end faces 11a being substantially flat surfaces. The inner and outer circumferential faces of the columnar portion 11 have arc like shapes in a circumferential direction. A bolt hole 12 which passes through the columnar portion 11 and the annular portion 10 is formed at a portion of the boss 9 corresponding to each columnar portion 11. Threads are formed at both axial ends of the bolt hole 12. In particular, the boss 9 is fixedly coupled to the flywheel 2 by a plurality of bolts 13 that are threaded into the left ends of the bolt holes 12. More specifically, the bolts 13 penetrate the hole 2c of the flywheel 2 from the engine side, and are then screwed in the bolt holes 12 of the boss 9. The clutch cover 16 is coupled to boss 9 by bolts 27 that are threaded into the right ends of the bolt holes 12.

The clutch cover assembly 3 urges the clutch disk assembly 4 so that the clutch disk assembly 4 can rotate together with the flywheel 2, as well as disengages the clutch by releasing the urging force through the operation of a driver. The clutch cover assembly 3 basically includes a clutch cover 16, a pressure plate 17, and a diaphragm spring assembly 18. The clutch cover assembly 3 is a pull type clutch in which the disengagement of the clutch is carried out by pulling out the inner circumferential edge of the diaphragm spring assembly 18 to the transmission side. The clutch cover assembly 3 is disposed so as to rotate together with the flywheel 2.

The clutch cover 16 is an annular disk shaped member. The clutch cover 16 includes a disk shaped outer circumferential portion 23, a cylindrical portion 24 extending axially toward the transmission side from the inner circumferential side of the outer circumferential portion 23, and a disk shaped inner circumferential portion 25 extending to the inner circumferential side from the transmission side end of the cylindrical portion 24. The engine side face of the outer circumferential portion 23 touches the transmission side end faces of the column portions 11 of the boss 9. An annular protrusion projecting toward the engine side is formed at the outer circumferential edge of the outer circumferential portion 23. The inner circumferential face of the annular protrusion touches the outer circumferential face of each column portion 11, thereby determining the radial position of the clutch cover 16 relative to the boss 9. Consequently, the clutch cover 16 is centered (radially positioned) relative to the flywheel 2 via the boss 9. The outer circumferential portion 23 is fixedly coupled to the column portions 11 by a plurality of bolts 27, as mentioned above. The clutch cover 16 has a plurality of holes 28 that are not threaded. Holes 28 are formed at positions along the outer circumferential portion 23 which correspond to the bolt holes 12. The bolts 27 are inserted in the holes 28 from the transmission side and are then screwed in the bolt holes 12. The inner circumferential portion 25 of clutch cover 16 faces the friction face 7 of the flywheel 2 with an axial space formed therebetween for receiving the pressure plate 17, the clutch disk assemblies 40 and 41 and the intermediate member 44.

The pressure plate 17 is disposed between the clutch cover 16 and the flywheel 2, adjacent to the clutch cover 16. The pressure plate 17 is an annular or disk-shaped member. The annular main body 36 includes a first face 36a facing the friction face 7 and a second face 36b facing the inner circumferential portion 25 of the clutch cover 16. The first face 36a is an annular and flat friction face.

A connecting portion 39 is formed at the annular main body 36 of the pressure plate 17 on the outer circumferential side. The connecting portion 39 extends radially outward from the annular main body 36 and is located axially between the annular portion 10 of the boss 9 and the outer circumferential portion 23 of the clutch cover 16. More specifically, connecting portion 39 has a plurality of flanges that are circumferentially spaced apart and located in between adjacent column portions 11. The connecting portion 39 extends in a circumferential direction. As shown in FIG. 2, the connecting portion 39 has touching faces 39a at both circumferential ends. The touching faces 39a face circumferential end faces 11a of the column portion 11 in a circumferential direction. The engagement between the touching face 39a and the circumferential end face makes the pressure plate 17 rotatable together with the boss 9 and also axially movable. In this way, a torque of the flywheel 2 is input to the pressure plate 17. The pressure plate 17 is neither directly fixed nor coupled to the clutch cover 16.

Figure 4:
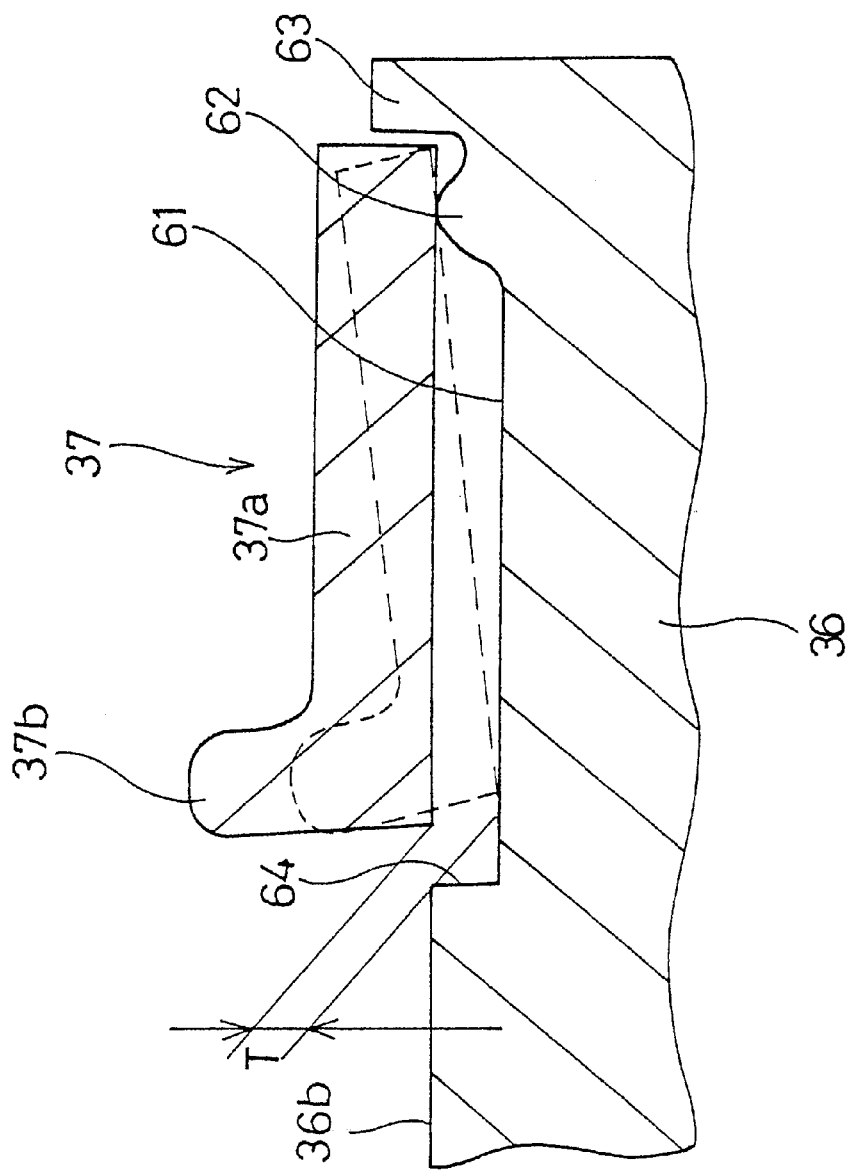
FIG. 4 is a partial cross-sectional view of the structure of a cushioning member disposed in an annular recess of a pressure plate for the clutch illustrated in FIGS. 1–3.

As best seen in FIG. 4, a cushioning member 37 is disposed on the second face 36b side of the annular main body 36 of the pressure plate 17. The cushioning member 37 performs a cushioning function during clutch engagement. An annular channel 61 is formed at the inner circumference of the second face 36b. The annular channel 61 is deeper than the second face 36b, which is at the outer periphery of the annular channel 61. A cylindrical portion 63 extending axially is formed at the inner circumferential edge of the annular channel 61. The cylindrical portion 63 extends axially more toward the transmission than the second face 36b. An annular supporting portion 62 projecting axially from the annular channel 61 is formed on the inner circumferential side of the cylindrical portion 63. The supporting portion 62 has a curved cross section.

The cushioning member 37, as shown in FIG. 4, is an annular or disk-shaped member. The cushioning member 37 is a plate spring, and in this embodiment particularly has a disk or washer like shape. The inner circumferential portion of the disk-shaped portion 37a of the cushioning portion 37 is supported against the pressure plate 17 by the supporting portion 62. The inner circumferential edge of the disk-shaped portion 37a touches the cylindrical portion 63, thereby determining the radial position of the cushioning portion 37. An annular fulcrum portion 37b projecting axially toward the transmission side is formed at the outer circumferential edge of the cushioning member 37. When the clutch is not engaged, the disk-shaped portion 37a maintains a roughly flat shape substantially parallel with the annular channel 61. The above-mentioned structure maintains a bending margin T between the disk-shaped portion and the annular channel 61.

The diaphragm spring assembly 18 (urging member) is a spring supported by the clutch cover 16 for urging the pressure plate 17. The diaphragm spring assembly 18 includes two diaphragm springs 29 and 30. Since a multi-plate clutch typically needs a large urging force, two diaphragm springs 29 and 30 are preferably used.

The first diaphragm spring 29 (first disk-shaped elastic member) includes a first annular elastic portion 31 and a plurality of first lever portions 33 extending from the first elastic portion 31 in a radially inner direction. The inner circumferential side face of the first elastic portion 31 on the engine side touches or is close to the fulcrum portion 37b of the cushioning member 37. The first lever portion 33 extends to the vicinity of the rotation axis O—O of the clutch 1. Slits are formed in between adjacent first lever portions 33. The circumferential width of each first lever portion 33 gets narrow toward the radial tip 35. The tip 35 of the first lever portion 33 is bent in the middle, to extend diagonally toward the transmission side, and then perpendicularly to the rotation axis O—O. In other words, the tip 35 of each first lever portion 33 is disposed at a different axial position from the inner circumferential portion of the first lever portion 33. A release device 19 (engagement member) is partially illustrated that preferably has a lever plate, a wire ring and a wedge collar. The release device is installed to engage the tips 35 of the first lever portions 33. The tips 35 of the first lever portions 33 are disposed at positions having a predetermined radial distance from the rotation axis O—O. In this way, a central bore is formed at the first diaphragm spring 29.

Oval bores 33a with a width larger than the slit between the first lever portions 33 are formed near the base (the outer circumference) of each of the first lever portion 33. The oval bore 33a has an oval shape longer in the radial direction. Because of the oval bore 33a, the circumferential width of the outer circumference of each first lever portion 33 is smaller than the circumferential width of the inner circumference.

The second diaphragm spring 30 is concentrically disposed axially next to the first diaphragm spring 29 on the transmission. The second diaphragm spring 30 touches the first diaphragm spring 29, and is urged so as to move away from the pressure plate 17 by the first diaphragm spring 29 when the clutch is disengaged. The second diaphragm spring 30 includes a second elastic portion 32 and a plurality of second lever portions 34 extending in a radially inner direction from the second elastic portion 32. The second elastic portion 32 is disposed on the same radial position as the first elastic portion 31. Slits are formed in between adjacent second lever portions 34. The circumferential width of each second lever portion 32 gets narrow toward the radial tip. The second lever portions 34 are formed corresponding to the first lever portions 33, and are disposed on the same radial position as the first lever portions 33. The radial tips of the plurality of second lever portions 34 are disposed at a position having a predetermined distance from the rotation axis O—O. In this way, a central bore is formed at the second diaphragm spring 30.

The second lever portion 34 is shorter than the first lever portion 33, and does not extend in a radially inner direction beyond the flat portion of the first lever portion 33. The radius of the central bore (the second central bore) of the second diaphragm spring 30 is larger than that of the central bore (the first central bore) of the first diaphragm spring 29. In other words, the inner diameter of the second diaphragm spring 30 is larger than the inner diameter of the first diaphragm spring 29. The outer diameter of the first diaphragm spring 29 is equal to the outer diameter of the second diaphragm spring 30.

Oval bores 34a with a width larger than the slit between the second lever portions 34 are formed near the base (the outer circumference) of each of the second lever portion 34. The oval bores 34a have an oval shape that is longer in the radial direction. Because of the oval bores 34a, the circumferential lengths of the portions of each second lever portion 34 between the oval bores 34a are smaller than the circumferential lengths of the inner circumferential tips of the second lever portions 34. The square bore 34a corresponds to the square bore 33a, both of which have the identical shape.

A wire ring 20 is disposed between the transmission side of the outer circumferential face of the second elastic portion 32 of the second diaphragm spring 30 and the engine side of the outer circumferential face of the inner circumferential portion 25 of the clutch cover 16. The wire ring 20 has a round cross section, and functions as a fulcrum on the clutch cover 16 side against the diaphragm spring assembly 18. The wire ring 20 touches the inner circumferential face of the cylindrical portion 24, thereby determining the radial position of the wire ring 20. The first and second elastic portions 31 and 32 are supported by the clutch cover 16 on the outer circumferential portion (the axial side face on the transmission side, the second face), and by the pressure plate 17 via the cushioning member 37 on the inner circumferential portion (the axial side face of the clutch cover 16 on the engine side, the first face). Instead of the wire ring 20, an annular or arc like supporting portion may be integrally formed as part of the clutch cover 16 so that the clutch cover 16 can support the diaphragm spring assembly 18 directly.

As shown in FIG. 1, the first and second diaphragm springs 29 and 30, have a flat shape. However, when the first and second diaphragm springs 29 and 30 are in the free condition (when the clutch cover assembly 3 is detached from the clutch 1), they have a cone shape. That is, the inner peripheral portions or inner tips of the first and second lever portions 33 and 34 of the diaphragm springs 29 and 30 are spaced farther from the inner circumferential portion 25 of the clutch cover 16 than from the outer peripheral portions of the first and second elastic portions 31 and 32. In this condition, while the first and second diaphragm springs 29 and 30 are axially movable against the clutch cover 16, a snap ring 21 (stopping member) is disposed on the side moving away from the inner circumferential portion 25, such that the snap ring 21 prevents the first and second diaphragm springs 29 and 30 from disengaging from the clutch cover 16.

In the condition as shown in FIG. 1, in which the clutch cover assembly 3 is installed in the clutch 1, the first and second elastic portions 31 and 32 are deformed axially therebetween. That is, when the clutch is released, the inner peripheral portions of the first and second diaphragm springs 29 and 30 are pulled out toward the transmission side, not urging toward the pressure plate 17. When the clutch is engaged, the outer peripheral portions of the first and second elastic portions 31 and 32 are supported by the clutch cover 16 on the transmission side (in this embodiment, via the wire ring 20), and the inner peripheral portions are supported by the pressure plate 17 on the engine side (via the cushioning member 37). In this way, the first and second elastic portions 31 and 32 urge the pressure plate 17 toward the friction face 7 of the flywheel 2. The first elastic portions 31 and 32 act in parallel. Therefore, the total urging force is the sum of the individual urging forces of the first and second elastic portions 31 and 32.

The snap ring 21 (stopping member) is disposed on the axial engine side of the elastic portions 31 and 32, and prevents the diaphragm spring assembly 18 from axially disengaging from the clutch cover 16. More specifically, the snap ring 21 is disposed on the axial engine side of the inner circumferential side of the cylindrical portion 24 of the clutch cover 16. The snap ring 21 is an annular member having a partially cut out portion. The snap ring 21 is inserted in a channel formed at the cylindrical portion 24. A predetermined axial gap is ensured between the snap ring 21 and the elastic portion 31. Because of the gap, the snap spring 21 does not interfere with the diaphragm spring assembly 18 when the clutch cover assembly 3 is installed in the clutch 1.

The pressure plate 17 has a plurality of pins 38 (rotation locking members) extending in an axial direction. These pins 38 are installed in the inner peripheral portion of the pressure plate 17 along the portion corresponding to an annular channel 61. The pins 38 are cylindrical members which have longitudinal slits extending in the axial direction. One end of each pin 38 is fitted tightly in a hole 36c formed at the pressure plate 17. Each pin 38 passes through one of the holes 37c which are formed in the cushioning member 37, and then penetrates the square bores 33a and 34a which are respectively formed in the first and second diaphragm springs 29 and 30. The diameters of the pins 38 are roughly equal to the diameters of the holes 37c of the cushioning portion 37. The pins 38 contact the holes 37c of the cushioning portion 37 on both circumferential ends. The structure mentioned above makes the cushioning portion 37 to rotate together with the pressure plate 17. The diameters of the pins 38 are smaller than the circumferential widths of the square bores 33a and 34a. Some of the pins 38 touch the R1 side, and others touch the R2 side of the square bores 33a and 34a. Consequently, the diaphragm spring assembly 18 rotates together with the pressure plate 17.

As described above, the plurality of pins 38 makes it possible for the cushioning member 37 and the diaphragm spring assembly 18 to rotate together with the pressure plate 17. Since there is no relative rotation among the members, abrasion is less likely to occur. In particular, since the pins 38 stop relative rotation of the cushioning member 37 and the diaphragm spring assembly 18 against the pressure plate 17, the number of parts can be reduced to a great extent.

The clutch disk assembly 4 includes a first clutch disk assembly 40 and a second clutch disk assembly 41. The first clutch disk assembly 40 is disposed on the axial engine side from the second clutch disk assembly 41. A clutch disk 42 (first friction member) of the first clutch disk assembly 40 is disposed close to the friction face 7 of the flywheel 2. A clutch disk 43 (second friction member) of the second clutch disk assembly 41 is disposed close to the first face 36a of the annular main body 36 of the pressure plate 17. Each of the clutch disks 42 and 43 has friction facings on both side faces, and functions as an output friction member of the clutch 1. The first and second clutch disk assemblies 40 and 41 have a torsion vibration dampening mechanism including torsion springs, etc. The first and second clutch disk assemblies 40 and 41 have hubs connected with a shaft (not shown) extending from the transmission. This structure makes the clutch disk assembly 4 work as an output rotary body of the clutch 1.

The intermediate plate 44 (friction connecting member) is disposed axially between the clutch disks 42 and 43. The intermediate plate 44 functions as an input friction member, which rotates together with the flywheel 2. The intermediate plate 44 is an annular member, and has an annular and flat friction face on both axial sides. An annular main body 45, which the intermediate plate 44 mainly comprises, includes a plurality of projecting portions 46 extending radially outward. The projecting portions 46 extend radially outwardly farther than the clutch disks 42 and 43. The projecting portions 46 are disposed axially between the annular portion 10 of the boss 9 and the outer circumferential portion 23 of the clutch cover 16, and circumferentially between the columnar portions 11. The projecting portions 46 extend in a circumferential direction, and have connecting portions 51 at both circumferential ends. The connecting portions 51 are connected with the columnar portion 11 of the boss 9 non-rotatably and axially movably relative to each other. More specifically, circumferential end faces 51a formed at the connecting portions 51 contact the circumferential end faces 11a of the columnar portions 11 in the circumferential direction.

Holes 47 extending in the radial direction are formed within the annular main body 45. The holes 47 are formed at positions corresponding to the projecting portions 46. As a result, the inside of the clutch 1 is open to the outside through both the hole 47 and the spaces between the columnar portions 11 which are located on the outer periphery of the holes 47. Therefore, the inside of the clutch 1 is cooled by air flowing radially outward due to the centrifugal force.

Springs 50 are disposed at both axial side faces of the projecting part portion. The springs 50 are fixedly coupled to the intermediate plate 44, and works as an elastic member to keep the intermediate plate 44 at the predetermined intermediate axial position between the flywheel 2 and the pressure plate 17 when the clutch is released. Due to the springs 50, a drag torque that is generated when the intermediate plate 44 is positioned axially closer to one of the clutch disks 42 and 43, is not likely generated during disengaging the clutch.

Figure 3:
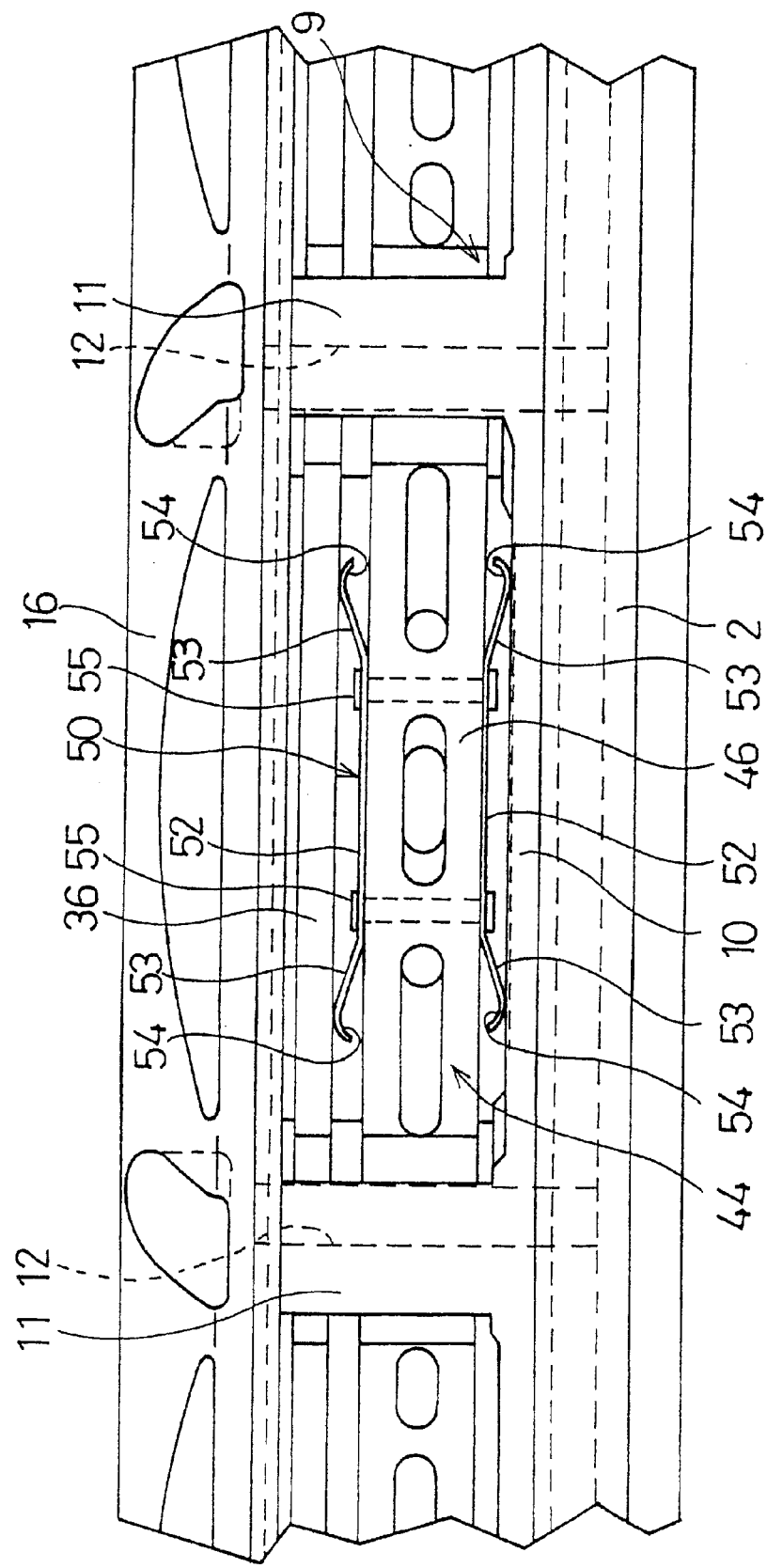
FIG. 3 is a partial edge elevational view of the clutch illustrated in FIGS. 1 and 2 as viewed along the arrow II of FIG. 2.

As seen in FIG. 3, the springs 50 are plate springs, and each includes a first portion 52 (fixing portion) extending in a circumferential direction, a pair of second portions 53 (elastic portion) extending in the axial direction from the circumferential ends of the first portion 52, and a pair of bent portions 54 bent from the tips of the second portions 53 toward the axially opposite side. The first portion 52 of each spring 50 touches the axial end face of the projecting portion 46 and is fixed to the projecting portion 46 by two pins 55. Each pin 55 fixes a pair of the springs 50 located in both axial sides of the projection portion 46. The second portions 53 extend diagonally from the axial end face of the projecting portion 46. The bent portions 54 are bent at the end of the second portions 53 toward the projecting portion 46, thereby forming a touching face protruding convexly opposite the projecting portion 46. The touching faces of the springs 50 on the axial engine side contact the side face of the annular portion 10 of the boss 9 on the axial transmission side. The touching faces of the springs 50 on the axial transmission side contact the axial engine side face of the connecting portion 39 of the pressure plate 17. During engaging or disengaging the clutch, the second portions 53 and the bent portions 54 of the springs 50 are kept in an axially compressed state.

In the clutch 1, friction connecting faces are formed between the friction face 7 of the flywheel 2 and the clutch disk 42, between the clutch disk 42 and the intermediate plate 44, between the intermediate plate 44 and the clutch disk 43, and between the clutch disk 43 and the first face 36*a* of the pressure plate 17.

The operation of the clutch 1 will now be described in more detail. When a driver steps on a clutch pedal, the release device 19 is pulled axially toward the transmission (the right side in FIG. 1). As a result, the lever portion 33 of the diaphragm spring 29 is moved axially toward the transmission side. At the same time, the second diaphragm spring 30 is moved axially toward the transmission by the first diaphragm spring 29. In this condition, the diaphragm spring assembly 18 does not urge the pressure plate 17, and the cushioning portion 37 is kept flat as shown in solid lines in FIG. 4. Since the pressure plate 17 is not urged, the clutch disks 42 and 43 of the first and second clutch disk assemblies 40 and 41, respectively, are separated from the flywheel 2, the intermediate plate 44 and the pressure plate 17. Therefore, a torque of the flywheel 2 is not transmitted to the clutch disk assembly 4. At that time, the intermediate plate 44 is kept at the predetermined position, axially between the flywheel 2 and the pressure plate 17, by the springs 50 fixedly coupled to the intermediate plate 44. As a result, the springs 50 hardly generate a drag torque, which is generated when the intermediate plate 44 is positioned axially closer to and touches one of the clutch disks 42 and 43.

When the driver releases the clutch pedal, the first and second diaphragm springs 29 and 30 of the diaphragm spring assembly 18 try to return to the original condition. In other words, the outer peripheral portions of the first and second elastic portions 31 and 32 urge the pressure plate 17 via the cushioning member 37. At the beginning of clutch engagement, the cushioning portion 37 is elastically deformed from the condition shown in solid lines to the condition shown in broken lines in FIG. 4. In other words, the fulcrum portion 37*b* is pressed by the first diaphragm spring 29, and the outer peripheral portion of the cushioning member 37 is pressed against the annular channel 61 of the pressure plate 17. The elastic deformation of the cushioning member 37 provides the cushioning effect during the operation of engaging the clutch.

After the cushioning member 37 is deformed, the pressure plate 17 moves toward the engine side, and presses the clutch disks 42 and 43 and the intermediate plate 44 against the friction face 7 of the flywheel 2. As a result, a torque is input from the flywheel 2, the boss 9 and the pressure plate 17 to the first and second clutch disk assemblies 40 and 41.

The cushioning effect of cushioning member 37 is obtained by the axial deformation of the cushioning member 37 during the clutch engaging operation. At the clutch release operation, a load is applied from the cushioning member 37 in a direction to release the clutch, resulting in the reduction of the release load. Consequently, the operation is improved during the operation of intermediate clutch engagement improves.

The rigidity and the bending margin of the cushioning portion 37 are adjustable, that is, the cushioning characteristic can be set freely. Therefore, there is a high degree of freedom to set the condition of the intermediate clutch engagement operation. In addition, when the clutch disks 42 and 43 are abraded heavily, it is possible to maintain the posture of the diaphragm spring assembly 18 by using a fulcrum portion 37*b* with a different height of the cushioning portion 37. In other words, it is possible to keep a setting load for a long time. Therefore, the adjustment at the time of abrasion of the clutch 1 can be carried out by exchanging a member smaller than the pressure plate 17. Since the cushioning portion 37 is a plate spring, high accuracy in dimension can be maintained. Since the cushioning member 37 is a flat plate spring, it is easy to set its characteristics.

In addition, since a gap is ensured between the cushioning member 37 and the pressure plate 17 on the outer circumferential side of the cushioning member 37, powder made by abrasion of the clutch disk 42 and 43 hardly enters between the pressure plate 17 and the cushioning portion 37, or can be removed easily due to the centrifugal force.

The above-mentioned cushioning member 37 can be used for a multi-plate clutch which has more friction connecting faces than the present embodiment. The cushioning member 37 can also be used for a clutch cover assembly including one diaphragm spring, a bush type clutch, or a gear drive type clutch having a plurality of teeth.

Since the pins 38 keep the cushioning member 37 and the diaphragm spring assembly 18 from rotating relative to the pressure plate 17, the abrasion of each fulcrum portion is prevented. Also, the number of parts can be kept small. Since it is easy to install the pins 38 in the cushioning member 37 and the diaphragm spring assembly 18, making the assembly of the clutch easy. As a member to prevent a relative rotation against the pressure plate 17, not only a pin but also other members such as a bolt can be used.

The pins 38 as members for preventing a relative rotation mentioned above can be used in a multi-plate clutch which has more friction connecting faces than the present embodiment. The member for preventing a relative rotation can also be used in a clutch cover assembly having one diaphragm spring, a push type clutch, or a gear drive type clutch having a plurality of teeth.

The boss 9 is a separate member from the flywheel 2 and the clutch cover 16. Therefore, the clutch 1 shown in FIG. 1, which is a twin clutch, can be changed to a triple type clutch with three clutch disk assemblies simply by replacing the boss 9. In the clutch 1, the boss 9 functions as a member that allows the clutch 1 to change the axial size. In other words, it is not necessary to replace large members such as the flywheel 2 or the clutch cover assembly 3, which has been the case with a conventional clutch. As a result, a user can change easily the specification of the clutch 1. In addition, when the connecting portion has to be replaced due to abrasion of the columnar portions 11 of the boss 9, it is enough to replace only the boss 9.

The boss 9 includes the annular portion 10 and the columnar portions 11. Since the boss 9 includes the annular portion 10 and the columnar portions 11, the accuracy of dimension of parts improves. For example, the annular face of the annular portion 10 touching the flywheel 2 becomes flatter. In addition, the axial end face of each columnar portion 11 touching the outer circumferential portion 23 of the clutch cover 16 is kept at the precise axial position.

The annular portion 10 of the boss 9 may be detachably fixed to the clutch cover 16. The plurality of columnar portions 11 may also be detachably fixed to the flywheel 2. The boss 9 may have a structure in which the annular portions 10 are integrally formed on both axial sides of the columnar portions 11.

The above-mentioned structure of the boss 9 can be used for a multi-plate clutch which has more friction connecting faces than the present embodiment. The boss 9 can also be used for a clutch cover assembly including one diaphragm spring or a push type clutch.

Since the springs 50 (elastic member) are disposed at the axial faces of the intermediate plate (annular portion) 44, the axial position of the intermediate plate 44 during the clutch disengagement is securely determined relative to the flywheel 2 and the pressure plate 17. More specifically, the intermediate plate 44 is disposed at an axially intermediate position between the flywheel 2 and the pressure plate 17. When the spring constants of the springs 50 on both axial sides are equal, the intermediate plate 44 moves in an axial direction so that the distance of the axial movement of the intermediate plate 44 is half the distance that the pressure plate 17 moves. When the spring constant of the spring 50 on the pressure plate 17 side is larger than the spring constant of the spring 50 on the flywheel 2 side, the intermediate plate 44 moves in an axial direction so that the distance of the axial movement of the intermediate plate 44 is less than half the distance that the pressure plate 17 moves. In this way, the ratio of movement of the intermediate plate 44 relative to movement of the pressure plate 17 can be determined by adjusting two spring constants of the springs 50.

Particularly in this embodiment, since the springs 50 are fixedly coupled to the intermediate plate 44 forming one friction connecting member, transporting and assembling of the member become easier. Since the plate springs 50 are bent to touch other members smoothly by the bent parts or portions 54, the plate springs 50 do not break easily.

The structure of the friction connecting portion having the springs 50 can be used in an intermediate plate 44 of a twin clutch (the present embodiment) and a pressure plate of a twin clutch, or a pressure plate of a single plate clutch, or a drive plate of a multi-plate clutch having more friction connecting faces than the present embodiment.

For example, the springs 50 can be fixed to the pressure plate 17 of the twin clutch such that springs 50 touch the intermediate plate 44 and the clutch cover 16 to hold the position of the pressure plate 17. Alternatively, the springs 50 are fixedly coupled to the pressure plate of a single plate clutch touches the flywheel and the clutch cover, thereby determining the axial position of the pressure plate. The springs 50 in a multi-plate clutch having a plurality of drive plates is fixed to the plurality of drive plates, and touches the axially adjacent drive plates, thereby determining the axial position of each drive plate.

Not only can a plate spring be used, but also other spring such as a coil spring can be used instead of the springs 50. The structure of the springs 50 can be used in a push type clutch or a gear drive type clutch having a plurality of teeth. The structure can also be used in a clutch cover assembly with one diaphragm spring.

The diaphragm spring assembly 18 has a large capacity of torque transmission of the clutch 1, because of the two diaphragm springs 29 and 30 which are disposed next to each other. In this embodiment, since the portion or tips 35 of the lever portions 33 that engage the release device 19 are formed in one diaphragm spring by making the inner diameter of the second diaphragm spring 30 large, installation of the release mechanism can be conducted in a conventional manner. Therefore, it is possible to install the release device 19 in the conventional manner. In other words, a commonly-used release device, instead of a release device with a special structure can be used in a diaphragm spring assembly with two diaphragm springs which are disposed next to each other.

The structure having two diaphragm springs can be used in a multi-plate clutch which has more friction connecting faces than a single clutch or the present embodiment. In addition, the structure having two diaphragm springs can be used in a push type clutch or a gear drive type clutch having a plurality of teeth.

The snap ring 21 (stopping member) is connected to the clutch cover 16 so that the diaphragm spring assembly 18 does not disengage from the clutch cover 16. In other words, the snap ring 21 makes the clutch cover 16, the wire ring 20, and the first and second diaphragm springs 29 and 30 be one sub-assembly. The sub-assembly can be handled as one member while the clutch 1 is transported and assembled.

In this embodiment in particular, since the pressure plate 17 is not fixedly coupled to the clutch cover 16 by a strap plate etc., it is important that the above-mentioned members form one sub-assembly during the transportation or assembly. In particular, in the case of a pull type clutch as shown in the figures, it is all the more important to have the sub-assembly such that the diaphragm springs 29 and 30 are not supported by the clutch cover 16 so as not to disengage from the clutch cover 16.

It is desirable that the snap ring 21 as a stopping member be detachable from the clutch cover 16 as needed and/or desired. When the stopping members are detachable, the wire ring 20 and the diaphragm spring assembly 18 can be replaced easily. It will be apparent to those skilled in the art that not only a snap ring can be used as a stopping member, but also other members can be used as a stopping member.

The snap ring 21, as mentioned above, can be used in a multi-plate clutch which has more friction connecting faces than a single plate clutch or the present embodiment. The stopping member 21 can be used in a clutch cover assembly which has a single diaphragm spring. The snap ring 21 is most effective when used in a multi-plate clutch such as boss drive type clutch in which the pressure plate 17 is not fixed to the clutch cover 16, and a pull type diaphragm spring is used.

The boss 9 in a multi-plate clutch 1 in accordance with the present invention is detachably fixed both to an input rotary body and to a clutch cover 16 of a clutch cover assembly. Therefore, working to replace the boss 9 is easy, when the boss 9 needs to be replaced. The boss 9 is preferably integrally formed a single, one-piece, unitary member that integrally includes an annular portion 10 and plurality of connecting (columnar) portions 11, thereby limiting the number of parts needed. For example, the boss 9 is casted one-piece, unitary member. The term "one-piece, unitary member" as used herein means a part that is not made of several parts that art permanently coupled together. Rather, the term "one-piece, unitary member" as used herein refers to a part that is made of one continuous piece of material.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A multi-plate clutch, comprising:
   an input rotary body with a friction face;
   a boss detachably coupled to said input rotary body, said boss including
      an annular portion, and
      a plurality of tubular connecting portions having first ends integrally formed with said annular portion as a one-piece, unitary part thereof and second ends extending from said annular portion in an axial direction to free ends, each of said plurality of connecting portions having an axially extending bore and being disposed circumferentially next to one another in substantially a circular pattern with radial pass-through spaces formed therebetween;
   a clutch cover assembly detachably coupled to said boss, said clutch cover assembly including
      a clutch cover detachably fixed to said boss with a radially extending portion arranged to face said friction face in an axial direction,
      a pressure plate disposed on said friction face side of said radially extending portion of said clutch cover, and
      an urging member supported by said clutch cover to apply an urging force on said pressure plate toward said friction face side; and
   at least one input friction member and at least one output friction member disposed axially between said friction face and said pressure plate to form at least three friction connecting faces.

2. The multi-plate clutch as set forth in claim 1, wherein said at least one input friction member is non-rotatably coupled to said plurality of connecting portions of said boss, but axially movable relative to said plurality of connecting portions of said boss.

3. The multi-plate clutch as set forth in claim 2, wherein said pressure plate is non-rotatably coupled to said plurality of connecting portions of said boss, but axially movable relative to said plurality of connecting portions of said boss.

4. The multi-plate clutch as set forth in claim 3, wherein said plurality of connecting portions have circumferential widths that are smaller than said radial pass-through spaces formed in between circumferentially adjacent ones of said connecting portions.

5. The multi-plate clutch as set forth in claim 2, wherein said annular portion is detachably fixed to one of said input rotary body and said clutch cover, and said plurality of connecting portions are detachably fixed to the other of said input rotary body and said clutch cover.

6. The multi-plate clutch as set forth in claim 2, wherein said plurality of connecting portions have circumferential widths that are smaller than said radial pass-through spaces formed in between circumferentially adjacent ones of said connecting portions.

7. The multi-plate clutch as set forth in claim 2, wherein at least two of said plurality of connecting portions have axially extending bores that receive first fasteners to couple one of said input rotary body and said clutch cover thereto.

8. The multi-plate clutch as set forth in claim 2, wherein said axially extending bores are threaded at both ends to threadedly receive said first fasteners in a first end to couple said input rotary body thereto and to threadedly receive second fasteners in a second end to couple said clutch cover thereto.

9. The multi-plate clutch as set forth in claim 1, wherein said pressure plate is non-rotatably coupled to said plurality of connecting portions of said boss, but axially movable relative to said plurality of connecting portions of said boss.

10. The multi-plate clutch as set forth in claim 9, wherein said annular portion is detachably fixed to one of said input rotary body and said clutch cover, and said plurality of connecting portions are detachably fixed to the other of said input rotary body and said clutch cover.

11. The multi-plate clutch as set forth in claim 9, wherein said plurality of connecting portions have circumferential widths that are smaller than said radial pass-through spaces formed in between circumferentially adjacent ones of said connecting portions.

12. The multi-plate clutch as set forth in claim 9, wherein at least two of said plurality of connecting portions have axially extending bores that receive first fasteners to couple one of said input rotary body and said clutch cover thereto.

13. The multi-plate clutch as set forth in claim 9, wherein said axially extending bores are threaded at both ends to threadedly receive said first fasteners in a first end to couple said input rotary body thereto and to threadedly receive second fasteners in a second end to couple said clutch cover thereto.

14. The multi-plate clutch as set forth in claim 1, wherein said annular portion is detachably fixed to one of said input rotary body and said clutch cover, and said plurality of connecting portions are detachably fixed to the other of said input rotary body and said clutch cover.

15. The multi-plate clutch as set forth in claim 14, wherein at least two of said plurality of connecting portions have axially extending bores that receive first fasteners to couple one of said input rotary body and said clutch cover thereto.

16. The multi-plate clutch as set forth in claim 14, wherein said axially extending bores are threaded at both ends to threadedly receive said first fasteners in a first end to couple said input rotary body thereto and to threadedly receive second fasteners in a second end to couple said clutch cover thereto.

17. The multi-plate clutch as set forth in claim 1, wherein said plurality of connecting portions have circumferential widths that are smaller than said radial pass-through spaces formed in between circumferentially adjacent ones of said connecting portions.

18. The multi-plate clutch as set forth in claim 1, wherein at least two of said plurality of connecting portions have axially extending bores that receive first fasteners to couple one of said input rotary body and said clutch cover thereto.

19. The multi-plate clutch, comprising:

an input rotary body with a friction face;

a boss detachably coupled to said input rotary body, said boss including
   an annular portion, and
   a plurality of tubular connecting portions having first ends integrally formed at one end with said annular portion as a one-piece, unitary part thereof and second ends extending from said annular portion in an axial direction to free ends, each of said plurality of connecting portions having an axially extending bore and being disposed circumferentially next to one another in substantially a circular pattern with radial pass-through spaces formed therebetween;

a clutch cover assembly detachably coupled to said boss, said clutch cover assembly including
   a clutch cover detachably fixed to said boss with a radially extending portion arranged to face said friction face in an axial direction,
   a pressure plate disposed on said friction face side of said radially extending portion of said clutch cover, and
   an urging member supported by said clutch cover to apply an urging force on said pressure plate toward said friction face side; and at least one input friction member and at least one output friction member disposed axially between said friction face and said pressure plate to form at least three friction connecting faces, said axially extending bores being threaded at both ends to threadedly receive said first fasteners in a first end to couple said input rotary body thereto and to threadedly receive second fasteners in a second end to couple said clutch cover thereto.

* * * * *